Patented Sept. 22, 1953

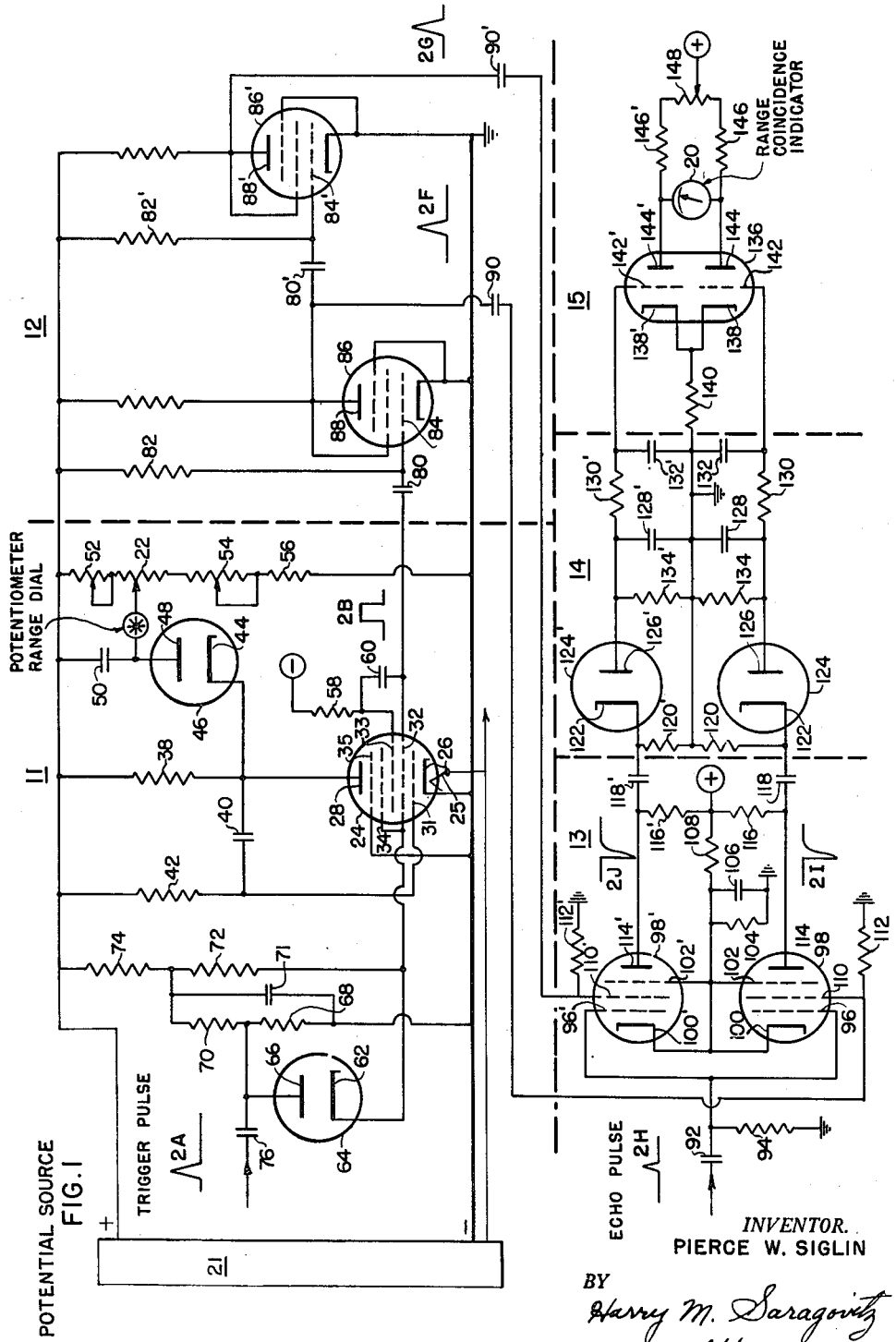

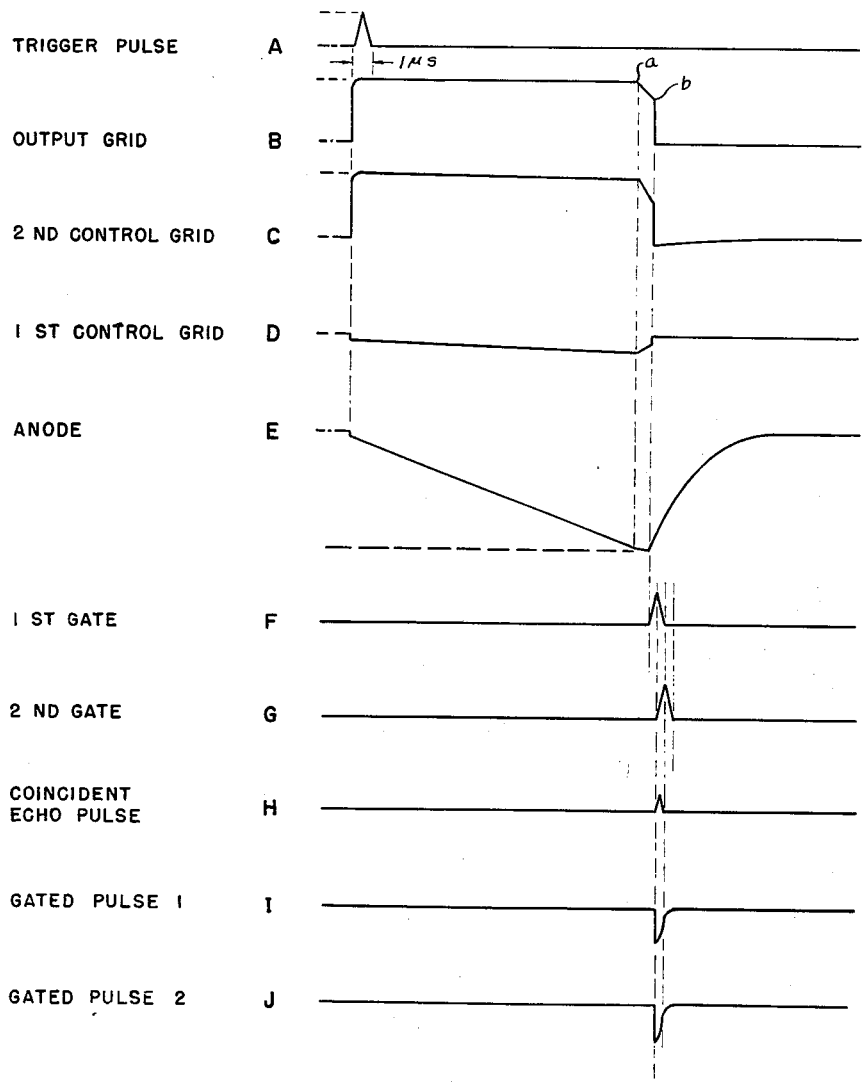

2,653,232

UNITED STATES PATENT OFFICE 2,653,232

RANGE MEASURING APPARATUS

Pierce W. Siglin, Asbury Park, N. J., assignor to the United States of America as represented by the Secretary of the Army Application June 6, 1950, Serial No. 166,523

3 Claims. (Cl. 250—27)

(Granted under Title 35, U. S. Code (1952), sec. 266)

The invention described herein may be manufactured and used by or for the Government for governmental purposes, without the payment of any royalty thereon.

This invention relates to a radio pulse echo object locating system in which the echoes may result either from a reflection or from a retransmission by equipment at the location, and more particularly to a linear delay device for use in the range determining portions of such a system having asynchronous generation of pulses. In such systems delays have been obtained by such devices as delay lines, which involve rather cumbersome circuits to produce the substantial delays required, and delay multivibrators, which ordinarily cannot be made with a linear characteristic.

To avoid the difficulties of such circuits, this invention utilizes a modified form of phantastron circuit which can quite readily be made to have a linear characteristic within a fraction of 1%.

By connecting the anode biasing diode of the phantastron to fix the minimum potential to which the anode may fall it is possible to avoid adverse effects of the diode on the linearity of the circuit.

In the usual phantastron circuit with clamping diode as in McGraw-Hill, Radiation Laboratory Series, volume 19, Wave forms, page 197, Fig. 5.46 the maximum potential is fixed; therefore diode and phantastron conduct alternately and potentiometer is loaded during the significant part of the cycle. By fixing minimum potential as shown in the present invention instead of maximum, the diode conducts only momentarily to terminate the waveform and therefore has no loading effect during the significant part of the cycle.

In the drawings:

Fig. 1 represents the ranging circuit into which the transmitted pulse 2A and echo pulse 2H are supplied so that the pointer of meter 20 indicates when the dial of range potentiometer 22 is correctly adjusted to the range of such echo; and Figs. 2A to 2J represent the waveforms involved in the operation of such circuits.

Fig. 1 may be considered as made up of a plurality of components including the range delay device 11, the double gate pulse generator 12, the balanced coincidence gating circuit 13, the balanced integrator circuit 14, and the balanced indicator output circuit 15.

A pulse 2A corresponding to the transmitted signal pulse is supplied to range delay device 11 and a substantially square wave 2B started by the pulse 2A is terminated at a time corresponding to the range as indicated by the selected setting of the dial of potentiometer 22. This wave 2B is supplied to generator 12 in which its trailing edge controls the generation of a first gate pulse 2F and second gate pulse 2G. These two gate pulses are supplied to the gating circuit 13 with echo pulse 2H thereby producing equal gated pulses 2I and 2J from circuit 13 if the echo pulse falls equally within the gate pulses. These gated pulses 2I and 2J are rectified and integrated in circuit 14 to provide equal output voltages from the two halves of the balanced circuit when the gated pulses are equal. These output voltages are converted to a suitable indication on the zero center meter 20, or whatever other form of indicator or automatic follow-up may be used, so that a balanced condition may be obtained by adjusting potentiometer 22 until the echo pulse 2H falls equally within the gate pulses 2F and 2G.

The range delay circuit 11 comprises a phantastron circuit in which a tube 24, having cathode 26, anode 28, and multiple control and one output grids, provides the desired delay similar to a multivibrator circuit. In the particular circuit shown the tube 24 is shown as having five grids acting primarily as first control 31, output 32, second control 33, auxiliary output 34, and suppressor 35. The cathode 26 and suppressor grid 35 are grounded. The anode 28 is connected through a conventional load resistor 38 to a source of high positive potential and through a "Miller" feedback condenser 40 to the first control grid 31 which is normally biased, to permit flow of current from the cathode 26, by a high resistance 42 also connected to the source of high positive potential. The anode 28 is also connected to the cathode 44 of a clamping diode 46, the anode 48 of which is connected to a bypass capacitor 50 and to the adjustable contact of precision potentiometer 22, having a dial accurately calibrated in terms of range. The winding of potentiometer 22 is connected from the source of positive potential to ground in series with minimum range adjusting resistor 52, maximum range adjusting resistor 54, and any further resistors such as 56, all of which may be of similar properties to avoid inaccuracies which might be involved in changes of ambient conditions. The second control grid is normally biased to cut-off through a resistor 58 to a source of negative potential, and is connected through capacitor 60 to the output grids 32 and 34 and also the cathode 62 of input diode 64. The anode 66 of diode 64 is connected to a source of bias voltage derived from the inner contact of a tapped resistor 68, 70, connected in parallel with bypass capacitor 71 from ground to the inner contact of a second tapped resistor 72, 74, connected from the output grids 32 and 34 to the source of positive potential, and through a capacitor 76 to the source of trigger pulse 2A.

The actual components used in the particular circuits are set forth in detail in Signal Corps Engineering Laboratories, Evans Signal Laboratory, Radar Branch, Technical Memorandum 182-R, and include the following:

Tube 24—6SA7
Tubes 46 and 64—½ of 6AL5
Potentiometer 22—20,000 ohm (linear .1%)
Resistor 42—1 megohm (low temperature coefficient)
Capacitor 40—100 mmfd.
Maximum slope duration—100 ms.
Capacitor 60—0.1 mfd.
Maximum range—10,000 yd.; 61 ms.
Capacitor 80—75 mmfd.
Capacitor 80'—15 mmfd.
Resistors 82 and 82'—100,000 ohm These elements and values are not critical, however potentiometer 22 should be linear within .1% to take advantage of the circuit linearity, capacitor 40 should be constant in value to avoid errors from varying ambient conditions, and capacitor 80' should be of suitable value to form the same shape gate pulse as capacitor 80.

In the quiescent state the first control grid 31 is supplied with a positive bias by resistor 42 and therefore the output grid 32 draws current and is maintained at a fairly low potential due to the voltage drop in resistors 72, 74. However, the second control grid 33 is supplied with a negative bias through resistor 58 and therefore the further grids and the anode do not draw any current and the anode assumes the same potential as the source.

When a trigger pulse is applied through diode 64, which otherwise isolates the trigger source from the phantastron circuit and prevents accidental trigger by small transient voltages, the grids 32 and 34 are supplied directly with this positive pulse and the grid 33 is also supplied with this pulse through the capacitor 60 therefore allowing the anode to draw current and to drop in voltage due to the anode resistor 38. This drop in voltage is applied to the grid 31 through the condenser 40 driving the grid 31 negative and therefore causing the grid 32 to become more positive. Since this more positive voltage is also applied to the grid 33 through the capacitor 60 the anode draws still more current. Due to the Miller feed-back time constant of capacitor 40 and resistor 42 the plate voltage follows in a linear manner to the point at which it approaches a steady state, the value of which is controlled by the range potentiometer 22 and the diode clamp 46. The anode variation approaches termination when the diode starts to conduct at point a of waveform 2B and with only a slight change in potential carries the entire anode current at point b. At this stage of the operation the grid 31 is no longer driven negative and starts to rise in a positive direction. As the grid 31 goes positive the grid 32 draws current and its voltage then follows in a negative direction. This negative going voltage is applied to grid 33 through the capacitor 60 driving the grid 33 toward cut-off. The anode current therefore reduces and its voltage rises. This rise in voltage is applied to grid 31 through the coupling capacitor 40 and causes the grid 32 to draw still more current. The accumulative effects result in the complete cut-off of anode current and the cycle is complete, ready to start over again when initiated by a succeeding trigger pulse. The waveforms are indicated in Fig. 2A-E. The output is taken from the voltage waveform of the grid 32 which is supplied to the gate generator circuits 12. Either point a or point b of the waveform may be selected for operation of circuit 12; although point a is self compensated for changes in anode and potentiometer voltage, variations in filament heating power are also compensated by selection of point b. A common source 21 supplies potential for heater 25 of tube 24 and the space currents of the tubes.

It will be noted that in this circuit the clamping diode does not conduct until the anode has dropped to its terminating value, therefore, it cannot affect the linearity of the range potentiometer reading by loading it in the quiescent state.

The double gate pulse generator 12 includes an input through a capacitor 80 to resistance 82 as a differentiating circuit for the grid 84 of tube 86 which is normally biased to permit current flow to anode 88 and overdriven by the differentiating input voltage to produce first gating pulse 2F of suitable short duration. Since the waveform 2B is differentiated there is a change in voltage to the grid 84 corresponding to points a and b; the positive bias on this grid assures that only point b will be effective thus providing compensation for anode, potentiometer, and heater voltage changes. A second identical circuit 80', 82', 84', 86', 88' is connected to the output circuit of tube 86, to produce a second pulse. Both pulses are supplied through coupling capacitors 90 and 90' to the gating circuit 13.

The gating circuit 13 includes an input circuit for echo pulses 2H through a coupling capacitor 92 and grounded resistor 94 to first control grids 96 and 96' of coincidence tubes 98 and 98', the cathodes 100 and 100' and suppressor grids 102 and 102' of which are biased to a suitable positive potential through resistor 104 bypassed by capacitor 106, with bleeder resistor 108 connected to a source of positive potential. The second control grids 110 and 110' of tubes 98 and 98' are connected to grounded resistors 112 and 112' and also to the coupling capacitors 90 and 90' of the gate pulse generator 12, providing the pulses 2F and 2G. The anodes 114 and 114' are connected through load resistors 116 and 116' to a source of high potential and through coupling condensers 118 and 118' to the circuit 14. When the echo pulse 2H coincides in time with gate pulses 2F and 2G, the anodes 114 and 114' pass gated pulses 2I and 2J which are of equal value when the echo pulse 2H occurs substantially midway in time between the gating pulses 2F and 2G, and differ in value as the time relation varies.

The integrating circuit 14 includes grounded input coupling resistors 120 and 120' connected to capacitors 118 and 118' of circuit 13 and to cathodes 122 and 122' of diodes 124 and 124'. The anodes 126 and 126' of these diodes are connected to integrating capacitors 128 and 128' and through filter resistors 130 and 130' to further integrating capacitors 132 and 132'; grounded bleeder resistors 134 and 134' are also connected to the anodes. This circuit rectifies and integrates the values of the pulses 2I and 2J to give substantially steady output voltages of corresponding magnitude, which are supplied to output circuit 15.

The output circuit 15 includes amplifier tubes 136 and 136' having cathodes 138 and 138' grounded through a common bias resistor 140, grids 142 and 142' to which the output voltages of circuit 14 are supplied, and anodes 144 and 144' connected to the output indicator 20 and through load resistors 146 and 146' and balancing potentiometer 142 to a source of high positive potential. The steady output voltages of circuit 14 are amplified and balanced against each other in meter 20 so that this meter shows only the difference in these values.

It will be seen that this invention provides a system of great simplicity but with excellent linearity in characteristics, permitting measurements to an accuracy of a few yards.

What is claimed is:

1. A linear pulse delay circuit comprising, a thermionic tube having cathode, first control grid, output grid, second control grid, and anode, a resistor from said second control grid to the negative terminal of a source of potential, resistors from each of said first control grid, output grid, and anode to the positive terminal of said source of potential, a heater for said cathode supplied from the same source as said source of potential, coupling capacitors between said anode and said first control grid and between said output grid and said second control grid, a clamping diode having an anode connected to said source of potential through a divider providing a linearly variable component of the potential of said source and a cathode connected to said anode of said tube, means to supply an input triggering pulse to said second control grid and means to derive a signal wave, started by said triggering pulse, from said output grid, of which the duration is linearly responsive to said variable component of said potential.

2. A linear pulse delay circuit comprising, a thermionic tube having cathode, first control grid, output grid, second control grid, and anode, a resistor from said second control grid to the negative terminal of a source of potential, resistors from each of said first control grid, output grid, and anode to the positive terminal of said source of potential, a heater for said cathode supplied from the same source as said source of potential, coupling capacitors between said anode and said first control grid and between said output grid and said second control grid, a clamping diode having an anode connected to said source of potential through a divider providing a linearly variable component of the potential of said source and a cathode connected to said anode of said tube, means to supply an input triggering pulse to said second control grid and means to derive a signal wave, started by said triggering pulse, from said output grid, which terminates first due to the partial conductivity of said diode at a point linearly responsive to the proportion of the potential of said source appearing on said potentiometer but affected by variation in heater voltage, and second due to full conductivity of said diode at a point linearly responsive to the proportion of the potential of said source appearing on said potentiometer but substantially fully compensated for variation in heater voltage, and means responsive to the second termination of said signal wave.

3. A linear pulse delay circuit comprising, a thermionic tube having cathode, first control grid, output grid, second control grid, and anode, a resistor from said second control grid to the negative terminal of a source of potential, resistors from each of said first control grid, output grid, and anode to the positive terminal of said source of potential, coupling capacitors between said anode and said first control grid and between said output grid and said second control grid, a clamping diode having an anode connected to said source of potential through a divider providing a linearly variable component of the potential of said source and a cathode connected to said anode of said tube, means to supply an input triggering pulse to said second control grid and means to derive a signal wave, started by said triggering pulse, from said output grid, of which the duration is linearly responsive to said variable component of said potential.

PIERCE W. SIGLIN.

References Cited in the file of this patent
UNITED STATES PATENTS

| Number | Name | Date |
|---|---|---|
| 2,172,746 | Young | Sept. 12, 1939 |
| 2,462,078 | Earp | Feb. 22, 1949 |
| 2,522,949 | Fleming-Williams | May 15, 1951 |